R. E. OLDS.
CONVERTIBLE AUTOMOBILE BODY.
APPLICATION FILED DEC. 4, 1905.
952,575.
Patented Mar. 22, 1910.
2 SHEETS—SHEET 1.
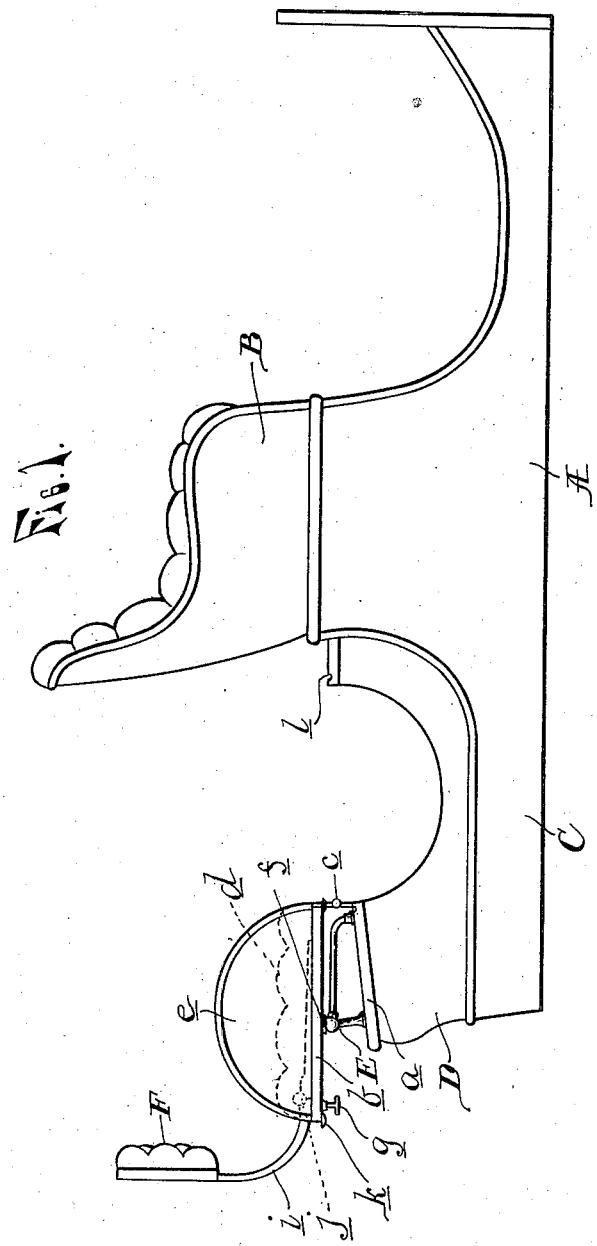
WITNESSES:
INVENTOR.
Ransom E. Olds
BY
ATTORNEYS.

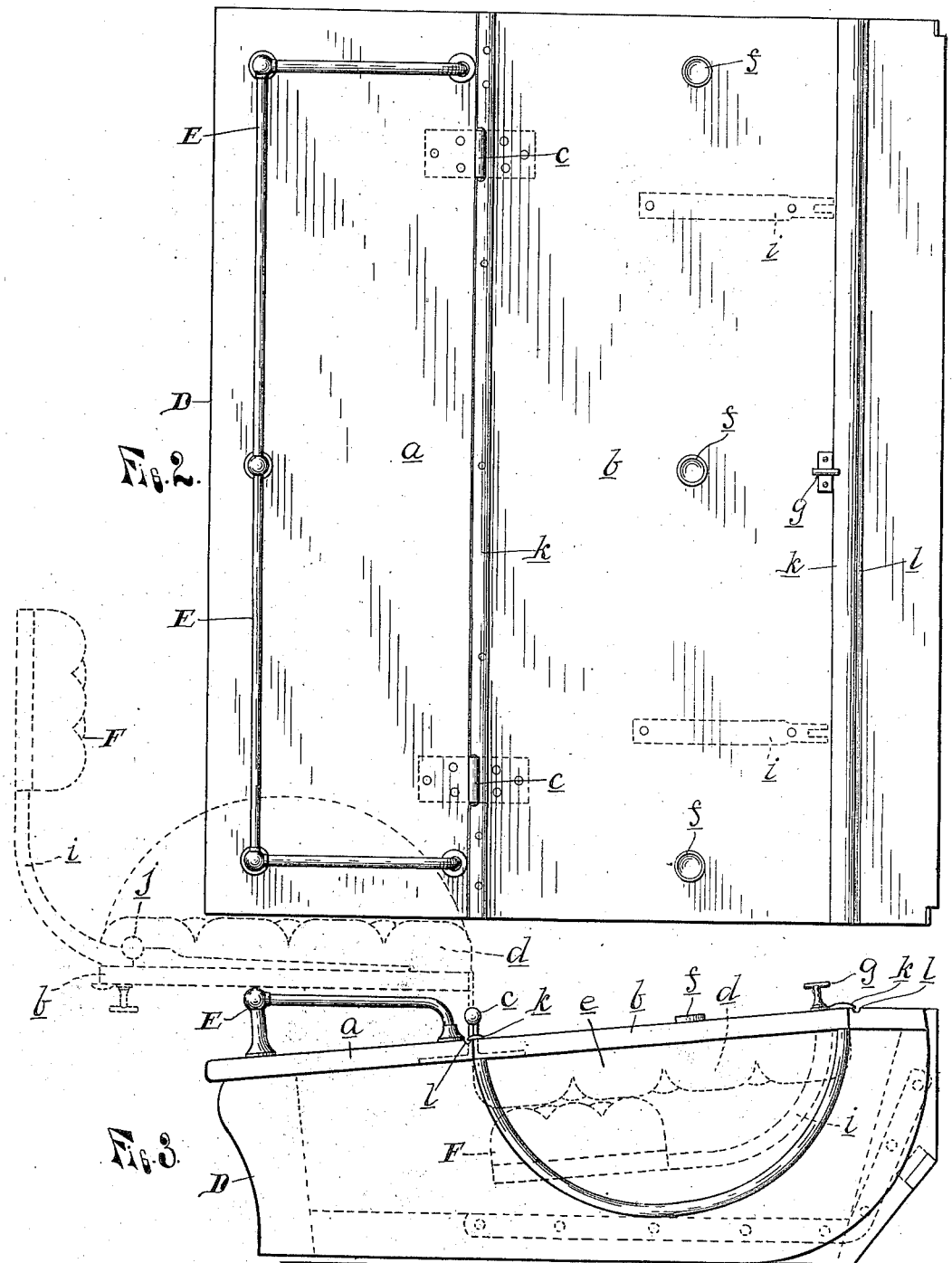

UNITED STATES PATENT OFFICE.

RANSOM E. OLDS, OF LANSING, MICHIGAN, ASSIGNOR TO REO MOTOR CAR COMPANY, OF LANSING, MICHIGAN, A CORPORATION OF MICHIGAN.

CONVERTIBLE AUTOMOBILE-BODY.

952,575.  Specification of Letters Patent.  Patented Mar. 22, 1910.

Application filed December 4, 1905. Serial No. 290,077.

*To all whom it may concern:*

Be it known that I, RANSOM E. OLDS, a citizen of the United States of America, residing at Lansing, in the county of Ingham and State of Michigan, have invented certain new and useful Improvements in Convertible Automobile-Bodies, of which the following is a specification, reference being had therein to the accompanying drawings.

This invention relates to automobile bodies of the well known runabout type which have but one seat and the object is to construct the body in such manner that it may be converted into a two-seated body and thus provide the same seating capacity as obtained by the so-called tonneau.

To this end my invention consists broadly in constructing the body with a rear portion or so-called deck which while in form and appearance is not different from the ordinary deck as generally found in the well known types of runabouts differs therefrom in being convertible into a rear seat portion.

My invention in its specific form consists in making this convertible deck in the form of an attachment, preferably to the usual type of body of the runabout automobile so that this convertible deck forms a complementary part of it merely increasing it in size without altering the style or appearance thereof when in its unconverted condition, all as more fully hereinafter described and shown in the accompanying drawing in which I show my invention as applied in its more specific form and in which—

Figure 1, is a diagrammatic elevation showing my convertible deck as applied in the form of an attachment to a body of the ordinary runabout type; Fig. 2, is a plan view of the convertible deck on a larger scale, and Fig. 3, is a side elevation of Fig. 2 showing in dotted lines the folding portions thereof.

A represents an automobile body of the usual runabout type having the single permanent seat B and the rearwardly extending sill portion C forming an integral part of the body.

D is the convertible deck, which as shown in Figs. 2 and 3 is constructed as a wholly independent part of the body A but of a size and shape to fit to the body and form in its unconverted condition in appearance a complementary part of the automobile body respectively of the deck thereof when placed in position thereon, suitable provision being made for securing it in position thereon. If desired it may be fastened removably so that the body may be restored to its original form. This deck I construct with a sloping top *a* having an intermediate movable portion *b* which is secured by means of hinges *c* to the rear portion of the top and is adapted to form a seat by folding it rearwardly, suitable upholstering *d* being applied to the underside. A portion *e* on each side is cut out of the sides of the deck and united to the seat portion *b*.

Upon the stationary rear portion of the top I place an ornamental rail E which is carried upon posts terminating in spherical bearings adapted to support the seat in connection with the hinges *c* at an adequate heat. The seat *b* is provided with cup-shaped rubber pads *f* registering therewith to prevent it from being jarred or marred by contact with the rail posts and with a suitable locking handle *g* to lock it in its closed position.

To the seat are secured the back irons *i* which form a hinge joint at *j* and have a suitable seat back F secured to them all in such manner that the back may be folded down upon the seat and be folded together with the seat, so that it will be concealed within the deck.

To prevent the rain from beating into the deck when closed I secure suitable battens *k* to the edges of the seat and provide the adjacent portions with little gutters *l* to carry off the water.

My construction is very simple, and provides a comfortable rear seat for two persons to sit and ride comfortably facing forward, the portions *e* of the sides of the deck forming end rests for the seat and at the same time disclose openings to form commodious side entrances to the seat. When closed up the outline of the body is in no way different from that of an ordinary runabout, and the seat is hid away and protected from all injury.

When folded down within the deck the seat is wholly concealed and protected from all injury and there is nothing in the outward appearance to distinguish it from the ordinary runabout, at the same time it takes but a few minutes to bring the rear seat into use and make the rig equal in seating capacity to that of the tonneau style and affording quite as comfortable riding since the rear seat faces forward and affords ample room for getting in and out through the side openings disclosed by the portions *e* of the seat. I preferably make these portions a part of the seat but it is obvious however that they may be formed into separate doors, and it is also quite obvious that instead of arranging the seat to fold rearwardly it may be arranged to fold forwardly to make it a dos-à-dos seat and other well known ways of arranging such folding seats may be carried out without departing from the scope of my invention.

My invention is of special advantage to the manufacturer since in building one machine he can practically meet the demand for either a one or a two seated machine, and by making suitable provision in the construction of the body and of the complementary deck portion, the latter may be fitted right onto and secured thereto without much delay or trouble.

Having thus fully described my invention, what I claim is:

The combination with a vehicle body having a permanent seat and an integral sill portion extending in rear thereof, of a supplementary body portion forming a closed permanent deck upon the sill portion and comprising an end, sides and a rearwardly sloping top, said deck formed with a hinged seat section comprising an intermediate portion of the top and portions of the sides adjacent to the ends of the intermediate portion and rigidly attached thereto, and a supporting rail for the seat section upon the rear of the deck, said rail having spherical enlargements and the seat section provided with cup-shaped bearings adapted to register therewith when the seat is folded rearwardly.

In testimony whereof I affix my signature in presence of two witnesses.

RANSOM E. OLDS.

Witnesses:
 E. F. PEER,
 GRETA LAYCOX.